(12) United States Patent
Tow (10) Patent No.: US 12,079,213 B2
(45) Date of Patent: Sep. 3, 2024

(54) AUTOMATED ENFORCEMENT OF RANGE-KEYED DATA

(71) Applicant: Oracle International Corporation, Redwood Shores, CA (US)

(72) Inventor: Daniel S. Tow, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 144 days.

(21) Appl. No.: 17/959,551

(22) Filed: Oct. 4, 2022

(65) Prior Publication Data

US 2024/0111764 A1    Apr. 4, 2024

(51) Int. Cl.
*G06F 16/00* (2019.01)
*G06F 16/22* (2019.01)
*G06F 16/2453* (2019.01)
*G06F 16/2455* (2019.01)

(52) U.S. Cl.
CPC ...... *G06F 16/2453* (2019.01); *G06F 16/2228* (2019.01); *G06F 16/24565* (2019.01)

(58) Field of Classification Search
None
See application file for complete search history.

(56) References Cited

U.S. PATENT DOCUMENTS

| | | | |
|---|---|---|---|
| 6,684,215 B1 | 1/2004 | Saracco | |
| 10,025,673 B1 * | 7/2018 | Maccanti | ............ G06F 11/1451 |
| 2014/0052703 A1 | 2/2014 | Spalten | |

* cited by examiner

*Primary Examiner* — Thu Nguyen T Le
(74) *Attorney, Agent, or Firm* — Hickman Becker Bingham Ledesma LLP (57) ABSTRACT

Techniques are disclosed hereafter for efficiently enforcing a "WITHOUT OVERLAP" range constraint by confirming primary-key integrity for a new or modified row (the "target row") by checking just two neighboring index entries, using a new "two-sided halted range scan" of the same key index on entities which have range-endpoints data as part of their primary key. Techniques are described for reducing search time and resources in situations where a query specifies an entity and a point within a non-overlapping range. Techniques are also described for optimized handling of queries that do not specify a primary key but have both a range condition and a filter on a non-key column.

22 Claims, 5 Drawing Sheets

AUTOMATED ENFORCEMENT OF RANGE-KEYED DATA

FIELD OF THE INVENTION

Techniques described herein generally relate to handling database operations involving ranges and, more specifically, to automated enforcement of range-keyed data.

BACKGROUND

It is often useful to store data that corresponds to ranges. For example, it may be desirable for a company to maintain an employee table that stores, among other things, the date ranges for the periods during which an employee worked at various departments within the company. To support storing date ranges in a database table, the SQL 2011 standard specifies new syntax for handling data over date ranges. For example, the statement:

```
CREATE TABLE Emp(
   ENo INTEGER,
   EStart DATE,
   EEnd DATE,
   EDept INTEGER,
   PERIOD FOR EPeriod (EStart, EEnd)
)
``` creates a table. The table includes an employee number column (ENo), a department column (EDept), and defines a date period from EStart to EEnd. Under the standard, the defined period is assumed to be "closed-open," meaning that the period includes EStart, but specifically excludes EEnd. Common implementations also include ranges defined as "closed-closed," meaning that the range includes both range endpoints, and two ranges for the same entity would "overlap" in this case if the end of one range equaled the start of the next range. A final range is often indicated by convention with an end date set to a conventionally-chosen "End-of-Time" date, such as Dec. 31, 2999, or can be indicated by a NULL end date, conventionally indicating no end for that final date range. A range specifying a NULL end would then "overlap" any other range for the same entity having a NULL end, or having a non-NULL end greater than the NULL-ended range's start. Tables that include an explicitly defined range for each entity (where the "entity" is specified by the "ID part" of the "ID-Range primary key") shall be referred to herein as ID-Range Tables (IDRTs).

The concept of date ranges can be generalized to ranges of any sortable type that can have a start and an end (e.g. block numbers on a disk), though that is not currently mentioned in the SQL standard. For the more general case, the term "PERIOD" could be generalized to "RANGE", as in the following example:

```
CREATE TABLE Emp(
   ENo INTEGER,
   EStart DATE,
   EEnd DATE,
   EDept INTEGER,
   RANGE FOR EPeriod (EStart, EEnd)
)
```

In many situations, it is desirable to prevent rows that store ranges for the same given entity from having overlapping ranges. Thus, if the IDRT emp has a row for Employee X where EStart is 1/1/2000 and EEnd is 1/10/2000, then table emp should not have:

any other row for Employee X that starts in the range 1/1/2000 to 1/10/2000, any other row for Employee X that ends in the range 1/1/2000 to 1/10/2000, or any other row for Employee X that starts before and ends after range 1/1/2000 to 1/10/2000.

One possible syntax for a primary key declaration that prohibits overlaps in the range for a given entity is:

ALTER TABLE Emp
   ADD PRIMARY KEY (ENo,
   EPeriod WITHOUT OVERLAPS)

Note that the above syntax defines an "ID-Range" primary key with an "ID part" (which is "ENo," in the example) with at least one column that specifies the entity that the ranges apply to, and a "range part" that specifies the start and end points of the range over which the other row data for that table row applies. Since this is specified WITHOUT OVERLAPS, at any given point within a possible range, and for any given entity specified by the full ID part, there can be at most only one matching row.

Unfortunately, no optimal mechanism for enforcing such a "WITHOUT OVERLAPS" constraint currently exists. Specifically, for every row inserted or updated under the above WITHOUT OVERLAPS range constraint, triggered SQL would have to generate errors when an operation would violate the constraint. The natural way to check for overlaps for the above key constraint is to have an index on (ENo, EStart,EEnd). When a row is inserted or updated, the database server would search the index for all rows having ENo=:new.ENo and EStart<:new.EEnd, with an index range covering the whole history of ENo up to :new.EEnd. After performing such a resource-consuming range scan, the database would then apply the filter AND (EEnd>:new.EStart/*overlaps at least start of range*/OR EStart>=:new.EStart/*overlaps end of range*/) to each row found in the index range scanned where we already know that EStart<: new.EEnd.

There is a clear need for a more efficient mechanism for enforcing a constraint that prevents overlaps of ranges associated with an entity.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are disclosed hereafter for efficiently enforcing a "WITHOUT OVERLAP" constraint. The techniques take advantage of the prior knowledge that all existing rows already lack overlaps (since they've already passed the constraint). The techniques involve confirming primary-key integrity for a new or modified row (the "target row") by checking just two neighboring index entries, using a new "two-sided halted range scan" of the same index on (ENo, EStart,EEnd). The two-sided halted range scan, and how it may be used to enforce WITHOUT OVERLAP constraints, shall be described hereafter in greater detail.

Techniques are also described for optimizing several database operations that target range data for which a WITHOUT OVERLAP constraint is being enforced. For example, techniques are described for reducing search time and resources in situations where a query specifies an entity and a point within a non-overlapping range.

Techniques are also described for reducing storage consumed by tables and indexes by dropping the "end" field for ranges where the end boundary is implicit due to a WITHOUT GAPS constraint.

Techniques are also described for optimized handling of queries that do not specify a primary key, but have both a range condition and a filter on a non-key column or columns.

The techniques described herein apply to all ranges. Ranges are defined by a start and an end that has any sortable datatype. A common use of ranges is date-like ranges (dates, timestamps, etc.). However, there are concrete use cases that are not date-based, like start and end blocks on disk that define segments of files or tablespaces, which should not overlap with any other file segments. The techniques described herein apply equally well to non-date ranges.

Enforcement of without Overlap Constraints Using a Two-Sided Halted Range Scan

Figure 2:
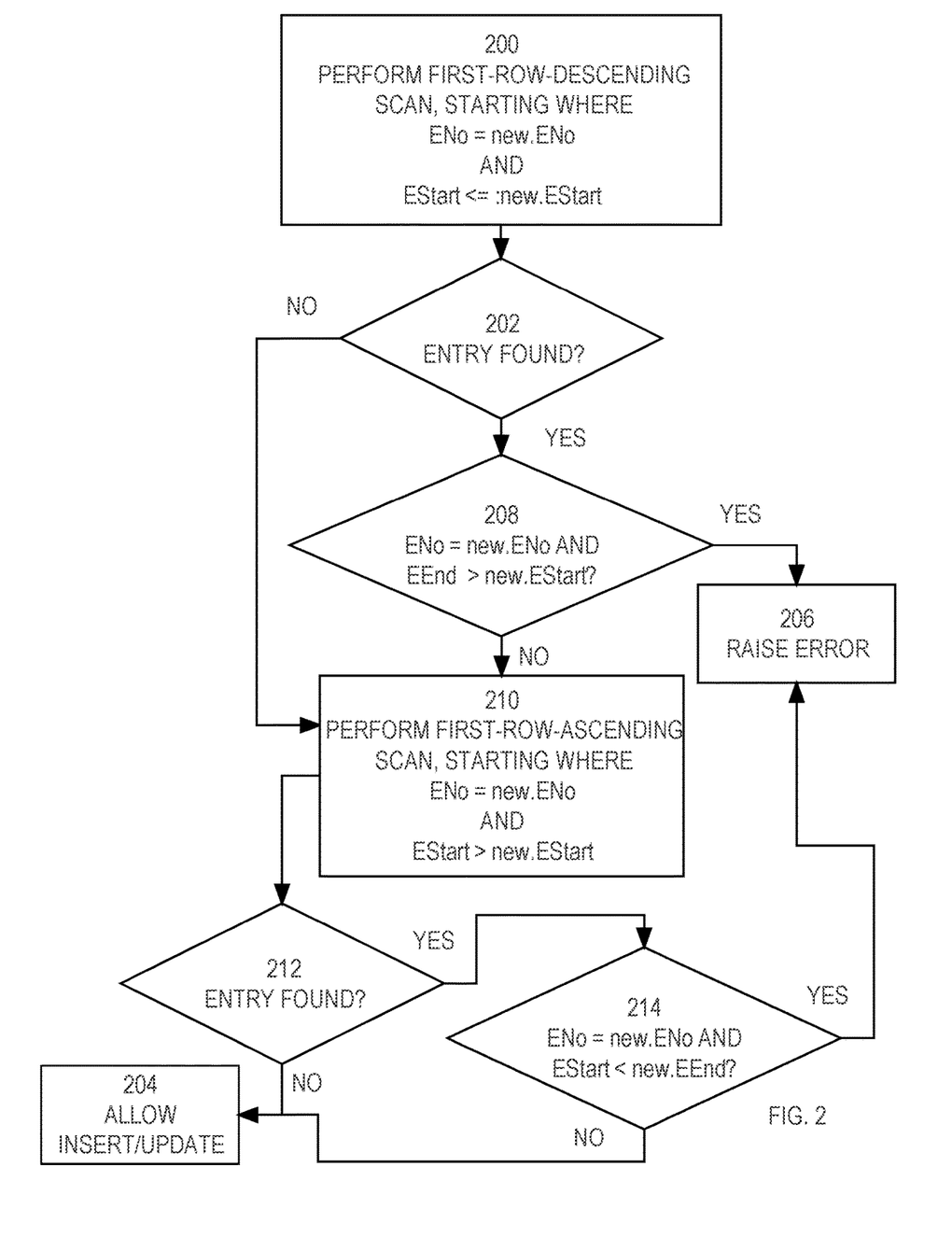
FIG. 2 is a flowchart for efficiently enforcing WITHOUT OVERLAP constraints, according to an implementation.

As mentioned above, a two-sided halted range scan may be used to enforce a WITHOUT OVERLAP constraint by taking advantage of the prior knowledge that all existing rows already lack overlaps. According to one implementation, a two-sided halted range scan involves checking just two neighboring index entries within index (ENo,EStart, EEnd). FIG. 2 is a flowchart illustrating steps for performing a two-sided halted range scan to detect WITHOUT OVERLAP constraint violations, according to one implementation.

As illustrated in FIG. 2, during a two-sided halted range scan, at step 200, the database server first searches in the descending index direction for the entry of the first row (if any) from the starting point ENo=new.ENo and EStart<=new.EStart. The entry located in step 200 shall be referred to herein as the "before-entry".

Figure 1:
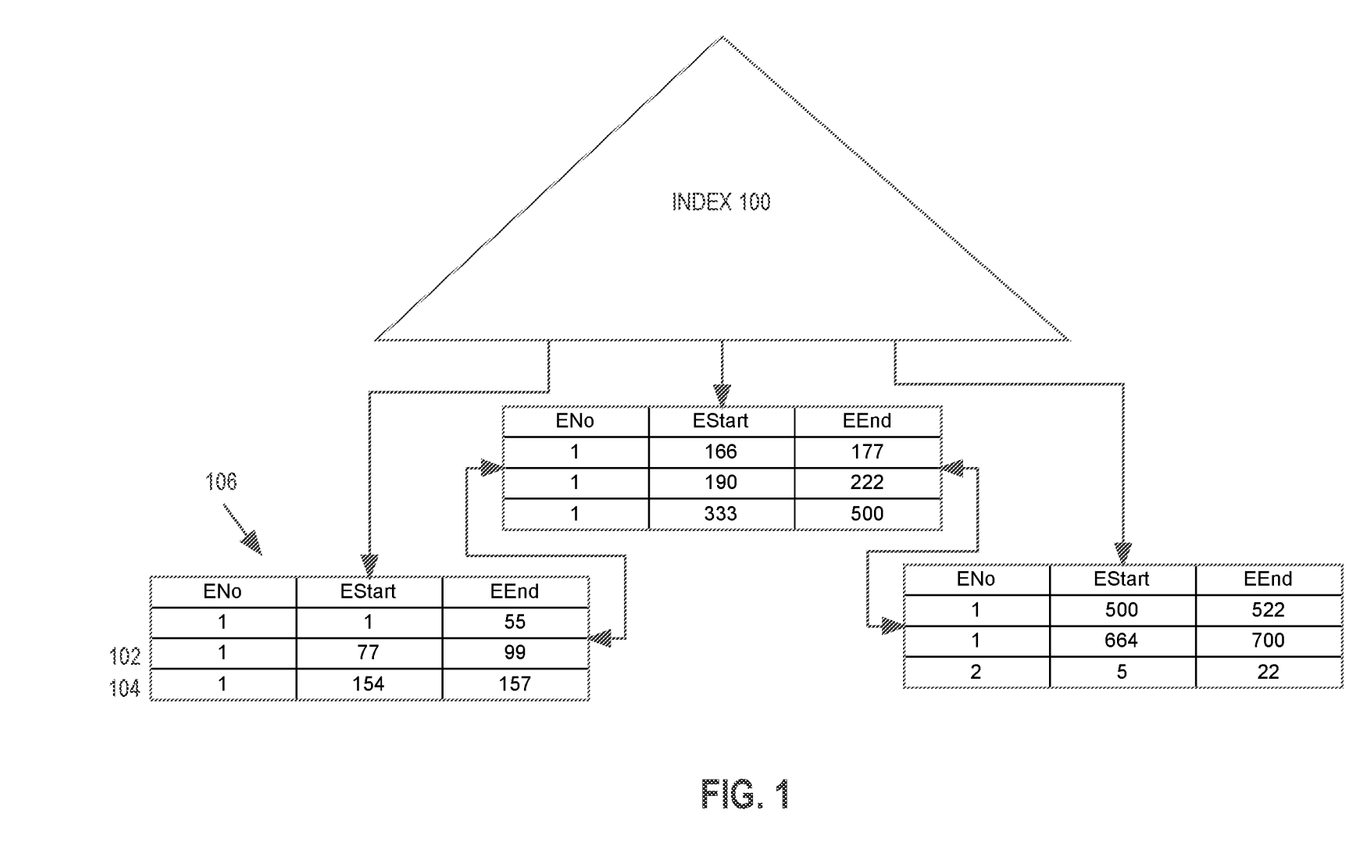
FIG. 1 is a block diagram of an index that may be used to efficiently enforce WITHOUT OVERLAP constraints, according to an implementation.

For the purpose of illustration, it shall be assumed that the index is index 100, illustrated in FIG. 1. It shall be further assumed that the operation is an insert operation, where new.ENo=1, new.EStart=105, and new.EEnd=120. In this example, step 200 involves searching index 100 in the descending direction to find an index entry where ENo=1 and EStart<=105. In the example illustrated in FIG. 1, the search performed in step 200 would locate entry 102, where ENo=1 and EStart=77. Thus, entry 102 is the before-entry in the present example. Note that the first entry the database encounters in this descending-order search could in general have a lower-numbered ENo value than the current ENo, so in the database layer, the database must check (in step 208) the Eno value of the entry found to see whether it still belongs to the range defined by the equality on ENo.

Returning again to FIG. 2, if no such before-entry is found in step 202, then control proceeds to step 210. On the other hand, if a before-entry is found at step 200, then control passes to step 208. In the present example, before-entry 102 was found during step 200, so control proceeds to step 208.

At step 208, the database server checks the before-entry to determine if ENo=new.ENo AND EEnd>new.EStart. If this condition is satisfied, then the before-entry is for the same entity as the new row and the new range overlaps with the range in the before-entry, and control passes to step 206 where an error is raised.

The question of whether two ranges overlap is mildly complicated, since ranges may overlap in several ways, but since the descending range scan has already established that if the ENo values are the same, then EStart<=new.EStart, so that the only remaining test required to establish overlap (contingent on EEnd defining a non-inclusive "open" end of the range) is to test EEnd>new.EStart. (If the range was defined as "closed-closed," then the test would be EEnd>=new.EStart.).

In the present example, EEnd (the end value contained in before-entry 102) is 99. (Note that the first row reached by the descending scan of step 200 may have a new, lower ENo value, if either the target row is the first for the given ENo value, or the scan began below the given Eno value's earliest record, which is why step 208 tests that the scan has not reached a new value of ENo, along with the test of EEnd.) The EEnd value 99 is not greater than the new.EStart value of 105. Consequently, the range in the before-entry does not overlap with the new range, so control passes to step 210.

Note that in all cases, the test asks: "Does the range to be created overlap with a before-entry range having the same ID part of the ID-Range primary key?", but the exact comparison required depends on the closed or open nature of the defined range endpoints, as well as on whether the first range column in the index (which determines the range-sort order) is the range start point or the range end point. Regardless of these choices, however, the test required is readily apparent given the other details and is equally simple to perform, for the computing system.

At step 210, the database server checks the neighboring index entry on the other side using ENo=:new.ENo and EStart>:new.EStart in the ascending index direction for only the first row found (if any). The entry located during step 210 is referred to herein as the "next-entry". If no next-entry is found in step 210, then at step 212 control passes to step 204 and the update/insert operation is allowed. Otherwise, control passes to step 214.

Referring again to the index illustrated in FIG. 1, step 210 would locate entry 104, where ENo=1 and EStart=154, which is greater than new.EStart of 105. (Note that the first row reached by the ascending scan of step 210 may have a new, higher ENo value, if either the new record is the first record for the given ENo, or the scan began above the given Eno value's last record, which is why step 214 tests that the scan has not reached a new value of ENo, along with the test of EStart.) Thus, in the present example, entry 104 is the "next-entry". Since a next-entry is found, control proceeds to step 214.

At step 214, the database server checks to see if the next-entry satisfies the condition ENo=:new.ENo AND EStart<:new.EEnd. If the condition is satisfied, then the new range overlaps with the range specified in the next-entry, and an error is raised at step 206. On the other hand, if the condition is not satisfied, then no overlap exists and control passes to step 204, where the insert/update is allowed. (Note that just as for step 208, this step simply determines whether the new range and the existing range overlap while belonging to the same ENo value, a test that is simplified by knowing that the existing range (if it belongs to the same ENo value) has a higher-valued EStart, so the only remaining test needed is to test whether EStart<new.EEnd.)

In the present example, the EStart of the next-entry is 154, and the new.EEnd is 120. Since EStart is not less than new.EEnd, then no overlap exists between the new range and the range specified in next-entry 104, and control passes to step 204 where the update/insert is allowed.

The process illustrated in FIG. 2 may be implemented by causing the database server to search for the (normally unoccupied) point in the index leaf block order corresponding to ENo=:new.ENo AND EStart=:new.EStart (which is exactly where the new index entry will be inserted, in the usual case where there is no key violation). In the present example, the entry for the new row (new.ENo=1, new.EStart=105, and new.EEnd=120) falls between entry 102 and entry 104. Once that index location has been identified, the database server must only grab the neighboring two index entries (usually) in that same index leaf block to check for constraint violation, an operation that should be nearly as efficient as an index unique scan, if implemented ideally. In the present example, the two index entries 102 and 104 are adjacent to the insertion location for the new index entry, and reside on the same index leaf block 106 that will store that new entry.

Optimized Search of Tables Having without-Overlap Constraints

Using the techniques described above, WITHOUT-OVERLAP constraints may be efficiently enforced by a database server. When a table has an enforced WITHOUT-OVERLAP constraint, the database server is able to perform certain optimizations. For example, the database server may automatically take full advantage of the constraint at query-execution time in a manner that avoids reading excess data. Specifically, the most common conditions used to query a range-keyed table (such as the Emp example) is with the full range primary key, in a search for the range that applies as-of some date (usually today), something like:

. . . AND <expression, usually a foreign key from another table>=e.ENo
   AND e.EStart<=:as_of
   AND e.EEnd>:as_of . . .

Currently, absent enforcement of the WITHOUT-OVERLAP constraint and given the most-common index scheme set up on (ENo, EStart, EEnd), the database server has no better choice than to scan the whole history of ENo prior to :as_of, in case any of those potentially-overlapping ranges contain :as_of. Switching the usually-chosen date-fields order in the index would shorten searches for recent :as_of data (since :as_of is usually right now). However, if the usually-chosen date-fields order is switched, the less-common searches for data for an old :as-of date would be disadvantaged.

Figure 3:
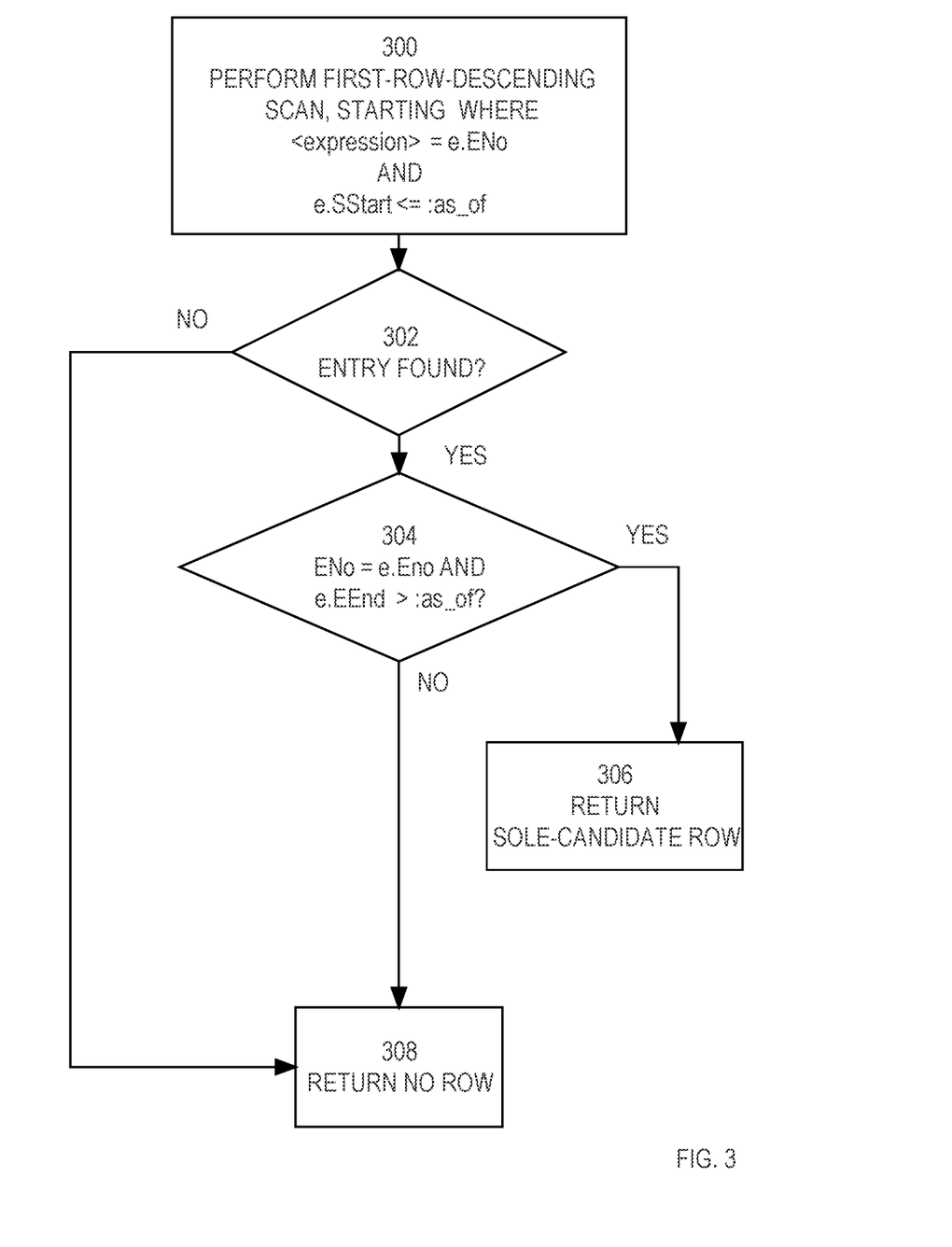
FIG. 3 is a flowchart for efficiently searching for query that (a) targets a table with an enforced WITHOUT OVERLAP constraint, (b) identifies an entity, and (b) specifies a range condition, according to an implementation.

On the other hand, when the database has the declared WITHOUT-OVERLAP constraint, the database server can and should take full advantage of the declaration at query-parsing time to constrain the search, when using the full key, to only the first range that can potentially overlap. An example of how the database server may take advantage of the WITHOUT-OVERLAP constraint when processing a query that specifies an "as_of" value is illustrated in FIG. 3. Note that using the proposed search optimization should not require that the original SQL be rewritten, as long as the ID-Range key has been declared WITHOUT-OVERLAP—the logic transformation for optimization would take place in the database layer.

Referring to FIG. 3, with the usual index on (ENo, EStart, EEnd), at step 300 the database server can run a new execution-plan-step that is referred to herein as a "first-row-descending scan" from
   <expression>=e.ENo
   AND e.SStart<=:as_of The row that is found by the first-row-descending scan (if any) is referred to herein as the "sole-candidate" row. If no sole-candidate row is found at step 302, then the as_of time is less than the start time of any row that matches the specified ENo, The database server may detect that no row will be found when, during the first-row-descending scan, the database server either (a) reaches an entry for a lower-valued ENo, or (b) reaches the end of the index. In both of these situations, the as_of time will not fall into any range associated with the specified ENo. Thus, control passes to step 308 where no row is returned.

For the purpose of illustration, assume that ENo is 1 and as_of is 130. Performing a first-row-descending scan of index 100 based on those values would identify the row associated with index entry 102 as the sole-candidate row, and control would proceed to step 304. On the other hand, if ENo is 1 and as_of is 0, then a first-row-descending scan would produce no sole-candidate row, and control would proceed to step 308.

If the first-row-descending scan reaches a sole-candidate row, then at step 304 the EEnd value in the index entry of the sole-candidate row is checked to determine whether the condition (using :Eno to represent the value of the matching expression from the original SQL):
   e.ENo=:ENo AND e.EEnd>:as_of
is satisfied. If e.EEnd>:as_of is true for the sole-candidate row which also holds the original ENo value, then at step 306 the sole-candidate row is returned. If the first-row-descending scan finds no sole-candidate row, or e.EEnd>:as_of is not true for the sole-candidate row, or if the descending scan has reached a new (lower) value of ENo, then control passes to step 308 no row is returned.

Note that ID-Range keys may use NULL EEnd values to represent a range extending into the indefinite future. In these situations, the test performed in step 304 would instead be: e.ENo=:ENo AND (e.EEnd>:as_of OR e.EEnd IS NULL). Note that if the algorithm was performing an outer join to the ID-Range key, a row would still return, but with no match from the outer-joined table. Generically, the result would be "no matched row is returned," which describes the result for both inner and outer joins.

In the example given above, (ENo is 1 and as_of is 130) returned the sole-candidate row associated with index entry 102. However, e.EEnd for index entry 102 is 99. Since 99 is not greater than 130, control passes to step 308 no row is returned.

There is no reason to extend the search beyond the sole-candidate row because if, hypothetically, the extended search found a row for the same ENo with a range including :as_of, then that row's range would also overlap that sole-candidate row's range, which constitutes a key violation that key enforcement would have already prevented. The new first-row-descending scan would have the same cost as an index unique scan, a substantial improvement over the currently-employed index range scans.

Reverse-Order Index

In the event that the application index order reversed the range endpoints with (ENo, EEnd, EStart), the optimizer would still be able to exploit the declared key with equal efficiency, choosing a sole-candidate row by performing an analogous "first-row-ascending scan" from     <expression>=e.ENo
    AND e.EEnd>:as_of The database server would stop the first-row-ascending scan at the first row found to satisfy the search criteria (the sole-candidate row), if any. The database server would then check the index entry for the sole-candidate row to determine whether     ENo=e.ENo AND e.EStart<=:as_of If the sole-candidate row satisfies this condition, the database server returns the joined row. Otherwise, no row is returned.

Index Variations

The index illustrated in FIG. 1 includes fields for both the start and end values of each range. However, the optimized search technique described above may be performed with nearly the same efficiency using an index that only has one boundary of the range. For example, a first-row-descending scan can be performed using an index that only has ID part of the key and the start field. (In the event that the ID-Range index has only one range endpoint, the index should be unique, since any two ranges having either the same range start point or the same range end point must necessarily overlap.) Once the index entry for the sole-candidate row is found and verified to have the required ENo value, then a pointer in the index entry may be used to locate the row within the table. The e.EEnd value of the sole-candidate row may then be retrieved from the table itself, to determine whether e.EEnd>:as_of is satisfied. (Since in practice this condition rarely fails, and since most queries must reach the table, anyway, the cost of checking the condition from table data instead of from index data will usually be negligible.)

Similarly, if the index only includes the end field of the range, the database server may perform a first-row-ascending scan to identify the sole-candidate row. In this case, the sole candidate row would be the first row where ENo=e.ENo AND e.EEnd>:as_of. Upon reaching the sole-candidate row and verifying that it has the required ENo value, the e.SStart value of the sole candidate row may be retrieved from the table to determine whether :as_of >=e.SStart. If :as_of>=e.SStart, then the sole-candidate row is returned.

Id-Contiguous-Ranges Tables

ID-Contiguous-Ranges Tables (IDCRTs) are an important special case of IDRTs, where the range part of the key is not allowed to describe non-contiguous ranges. IDCRTs may be said to have a WITHOUT GAP constraint. It should be noted that WITHOUT GAP can really mean that the actual gap is at the range variable's limit of resolution, if the range is defined as "closed-closed," that is, if it includes both range endpoints. For example, date ranges are commonly defined as beginning and ending on whole dates (dates at midnight), inclusive, so the gap between the end_date of one range and the start_date of the next closed-closed range is technically non-zero, but precisely 1 day, and since no whole day (date value at midnight) lies in that gap, the gap is effectively non-existent.)

Current implementations of IDCRTs fail to enforce ranges to avoid overlaps or to be contiguous, and their range-key data often grow corrupt over time, resulting in inevitable wrong results from queries against this corrupt data. They also are inefficient in terms of performance and storage, and require very complex code to even attempt to maintain range-key integrity at the application layer.

One approach for implementing IDCRTs involves sometimes inserting ranges into the range of an entity's existing ranges, which requires creating a gap, first, temporarily violating the contiguous-ranges requirement, then, in the same commit cycle, inserting one or more ranges that re-fill that gap, restoring adherence to the contiguous-ranges requirement, so that the only time the key integrity can be properly enforced is at the commit, and, at the commit, several ranges for the given entity must be examined to confirm that ranges are still non-overlapping and contiguous. Unfortunately, this approach is inefficient.

In practice, the clearest examples of IDCRTs are tables designed to track data over time, so examples shall be given in the contexts of temporal-history tables, where the ranges are defined by date-like endpoints, a Start_Date and an End_Date. In this case, the End_Date is a denormalization, defined as whatever date makes the interval contiguous-but-non-overlapping with the following interval's Start_Date. While examples shall be given in the context of date ranges, the techniques described herein apply just as well to contiguous-and-non-overlapping range keys that do not have date-like range endpoints.

The same faster-queries techniques described above apply if the ranges are not only declared non-overlapping, but also declared contiguous. According to one implementation, under these circumstances, the database server needs to store only the start of the range, correctly inferring the end-of-range to be automatically correct in the interval found through a first-row-found key-index scan starting from the as-of date. When a last range terminates (where that is allowed), an effective all-entity end point, which may be tracked as a separate property of the whole entity, may be separately maintained by the database server. In cases where the last range is assumed unlimited, then the row found with a first-row-descending scan to the range start point, having the correct ID part of the ID-Range key, is automatically the desired row (without any test of the end point required), since an end point lower than the search point would imply existence of another, higher range start point that the first-row-descending scan should have seen first. Therefore, in this scenario, the first-row-descending scan, alone, finding a row with the specified ID part, establishes range overlap.

Since in the important contiguous-and-non-overlapping ranges case, one range's endpoint is generally the next range's start-point (minus a fixed minimum gap, if the ranges are closed-closed), the end-points are denormalizations and don't even have to be stored. In fact, so long as the database has no rows for a given entity with identical starts (if the index on (entity_id, start) is unique, that is, as it should be), and the database does not store end-of-range, then the database server can guarantee contiguous-and-non-overlapping ranges without any constraint check at all, beyond what an ordinary unique index on (entity_id, start) provides.

For any unique index at all that contains n columns (n>1), one may view the first n-k columns (with $1<=k<n$) as the ID part of an ID range key, and the final k columns (with k usually equal to 1) as a range-end column or columns for the single explicit range end stored, the other range end being implied by the neighboring row's range value. Since every single such multi-column index can map successfully to one or more such contiguous-and-non-overlapping ID-Range keys, it should not be necessary to explicitly declare these keys, so long as we have the multi-column unique indexes that imply these keys. Simply having the multicolumn unique index should be sufficient to enable an efficient first-row-halted directional range scan to locate the range for the required row, with the required ID-range key being implicit simply in the existence of the unique index enabling the first-row-halted range scan.

In addition to finding rows overlapping specified as-of dates, the above ID-Range keys implicit in multi-column indexes are particularly applicable to finding detail rows that are highest-valued or lowest-valued according to some sort criteria. For example, consider a non-temporal table Employees with columns (Employee_ID, Department_ID, Title, Salary, Full_Name) and a Departments table with columns (Department_ID, Department_Name). We may wish to show the department names, highest-paid-employee names and top salaries for each department, with highest-employee_ID as tie-breaker for a two employees having the same salary in a given department, with the query (which is possible with existing SQL syntax):

```
SELECT d.Department_Name, e.Full_Name, e.Salary
FROM
Departments d,
(SELECT Department_ID, Full_Name, Salary
  FROM
  (SELECT Department_ID, Full_Name, Salary,
    RANK( ) OVER (PARTITION BY Department_ID
      ORDER BY Salary DESC, Employee_ID DESC) rk
  FROM
  Employees e)
  WHERE rk = 1) e
WHERE d.Department_ID = e.Department_ID
```

Note that while the above query does not explicitly state a range condition, it does nevertheless implicitly demand a specific implicit salary range, the highest-sorted range as defined by range starting points defined by (Salary, Employee_ID), so a first-row-descending range scan just like that required in FIG. 3 is the best-performing solution, and since in this new case the end-of-range condition is automatically fulfilled by the automatic lack of range gaps, a unique index on Employees (Department_ID, Salary, Employee_ID) is sufficient to drive the efficient first-row-descending scan for each joined Employee row, to find only the rk=1 rows required, without touching any other rows from the Employees table or even from the given index. If the above query was modified to ORDER BY Salary ASC, EMPLOYEE_ID ASC, with no other changes, it would return the lowest-paid employee of each department, with Employee_ID as tie-breaker, this time with the efficient path being a first-row-ascending scan of the same index for each joined row. Generically, a "first-row-directional" scan may refer either to a first-row-descending scan or to a first-row-ascending scan, whichever one is required to find the required row directly, depending on the query, and, generically, the first-row-directional scans, here, are the only necessary step to assure that the query reaches the requested, specified range.

As illustrated in the above example, a unique multi-column index is by itself sufficient to specify that its table is associated with a range that verifiably meets WITHOUT-OVERLAP and WITHOUT-GAP constraints, with the leading column or columns of that multi-column unique index providing the ID part of the key, and with the trailing column or columns of that same index providing the start or end point of the ranges, with the opposite end point (where limited on that end) being provided by the neighboring range. Given a multicolumn unique index, or an index-oriented table with a multi-column unique key, no other step is necessary to make the implicit ID-Range key usable in exactly the same ways an explicit ID-Range key is usable.

If the database server stores both endpoints for declared contiguous-and-non-overlapping primary keys, key checking is much more difficult, as many legitimate data changes must create gaps between ranges before filling in those gaps with a separate range insert, making COMMIT time the only time that contiguous-and-non-overlapping primary keys can be enforced.

Without-Gap Ranges and Virtual Columns

As mentioned above, a range may be constrained both as WITHOUT OVERLAP and WITHOUT GAPS. As mentioned above, an implicit ID-Range key specifying only range end-points or only range start-points is established by a multi-column unique index and this implicit ID_Range key is automatically WITHOUT OVERLAP and WITHOUT GAPS. A without-gap range constraint (a.k.a. a "continuous" range constraint) means that no gaps are allowed between the ranges specified for a given entity. The index entries for entity ENo 1, illustrated in FIG. 1, would violate a WITHOUT GAPS constraint because gaps exist between the ranges associated with the entries for ENo 1. For example, the range in entry 102 ends at 99, while the next range (specified in entry 104) does not start until 154.

According to one implementation, when a range is constrained to be WITHOUT OVERLAP and WITHOUT GAPS, then the table and index need only store the start of each range. For an index that is in ascending order, the end of the range for each row would be implicit in the start time for the index entry immediately following the index entry of the row.

Figure 4:
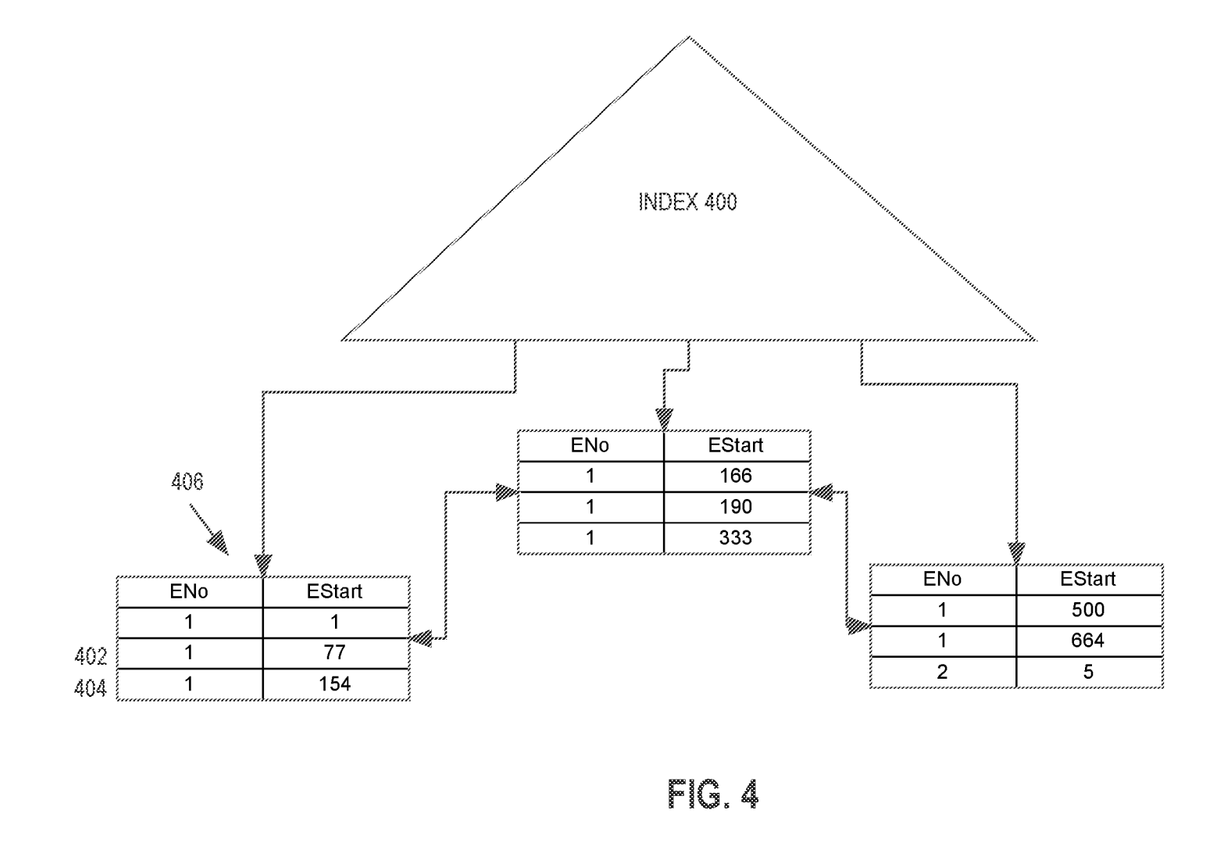
FIG. 4 is an example of an index where the range End field is virtual, where End values of ranges for an entity are implicitly determined based on Start value of the next range for the entity, according to an implementation.

Referring to FIG. 4, it illustrates an index built on a table that stores a range that is both WITHOUT OVERLAP and WITHOUT GAPS. As illustrated in FIG. 4, the index 400 is built on:
  the column(s) that define the entity (e.g. ENo), and
  the start value for the range Because the index does not include the end value for any range, the end value may be derived implicitly from the start value specified in the "adjacent-ascending" entry for the same entity_id. (The row having the highest Start_Date for a given entity_id would be inferred to apply to all range values>=Start_Date until such time as a row with a higher-valued start_date was inserted for that same entity_id.) In the example illustrated in FIG. 4, entry 402 specifies a range with the start value of 77. Entry 404 is the adjacent-ascending entry relative to entry 402 and shares ENo=1. The start value in entry 404 is 154. Thus, the end value for the range in entry 402 is 153 (if the range is treated as whole-numbered and closed at the end) or 154 (if the range is treated as open at the end).

Avoiding the storage of end values in the index and tables saves storage. In addition, it avoids the need to enforce the WITHOUT GAPS constraint, since each range is assumed to extend up to the start time of the subsequent range. Because of this assumption, it is not possible to insert a row that leaves a gap between its range and the range of the row that corresponds to the adjacent-ascending entry.

As mentioned above, the end values of ranges need not be stored in base tables or indexes, since the end values of any given range may be derived from the start value of the adjacent-ascending row having the same entity_id. However, a user may still request that a query return end values. Under these circumstances, the database server derives the end value for each range included in the result set by locating the adjacent-ascending entry for each range, and deriving the end value based on the start value specified in the adjacent-ascending entry, or returning a fixed high value, or NULL to conventionally indicate that the given range is the final, forever-valid range, if the adjacent-ascending scan does not find an entry that applies to the given entity. For example, assuming that the range is open, index 400 may be used to answer the query SELECT EStart, EEnd from emp WHERE ENo=1 and EStart<200 with the values:

| EStart | EEnd |
|---|---|
| 1 | 77 |
| 77 | 154 |
| 154 | 166 |
| 166 | 190 |
| 190 | 333 |

In the example given above, the database server dynamically derives the EEnd values in response to the query and returns them as if the table/index actually stored values for the EEnd field.

Optimizing Queries that are not Primary-Key Limited

In the examples given above, techniques are used to optimize queries that explicitly specify the entity for which data is desired. Such queries are referred to as "primary-key limited" because the column(s) that identify the entity are typically defined as the ID part of the ID-range-primary key of the tables. For example, for the table that is indexed by index 100 in FIG. 1, ENo is the primary key ID column. While ENo is a single column ID part of an ID-range key, composite ID-key-parts may include multiple columns.

The techniques described above may be used to increase the efficiency of even those queries that are not primary-key limited. For example, assume that the table includes a "zip_code" column, as well as ENo, EStart and EEnd. As mentioned above, the EEnd column may actually be virtual, if the range is both WITHOUT GAPS and WITHOUT OVERLAP.

Under these circumstances, the database may receive a database query that specifies a condition on the zip_code column (i.e. zip_code=92705) instead of a condition on the primary key column. To optimize the handling of such queries, the database server may maintain a zip-code-to-ENo mapping. The zip-code-to-ENo mapping may be similar to an index, except that the structure need not include the row_id of the corresponding table row. The mapping need not have the row_id because the structure is not used to access rows of the underlying table, but rather to obtain the primary key values of all rows that satisfy the non-primary-key condition specified in queries.

For example, in response to a query that specifies zip_code=92705 and as_of=50, the database server may:
Use the zip-code-to-ENo mapping to find all ENo values that map the zip_code 92705
For each of the ENo values identified in the previous step, perform the optimized search technique illustrated in FIG. 3.
In this example, the zip-code index-like mapping holds (zip_code,entity_id) but has no rowid, since the mapping is used only as a pass-through to reach the unique temporal-key index on (entity_id, start_date, end_date) in a two-step process for an efficient query on a zip code for records that apply to a specific date. (In the given example, entity_id would be replaced by ENo.)

Such non-primary-key-to-primary-key mappings may be implemented in a variety of ways. For example, some database servers already have index-only tables (IOTs) that could hold these two columns in a sorted index-like structure with no rowid pointing to another table, so the new type of index could look just like an IOT on the same two columns, with the only difference being that an ordinary IOT is an independent object, while the non-primary-key-to-primary-key mapping could automatically sync with distinct values of (zip_code,entity_id) for all rows of the parent temporal table. In one implementation, this could be done with an ON STATEMENT-updated 2-column IOT-type materialized view.

Note that a given entity_id might appear in multiple rows of the new IOT-like mapping if the given entity moved between zip-codes over time, as reflected in rows covering different temporal ranges, but the same pair (zip_code, entity_id) would never repeat in the IOT-like object, however many rows showed the same entity at the same zip-code.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
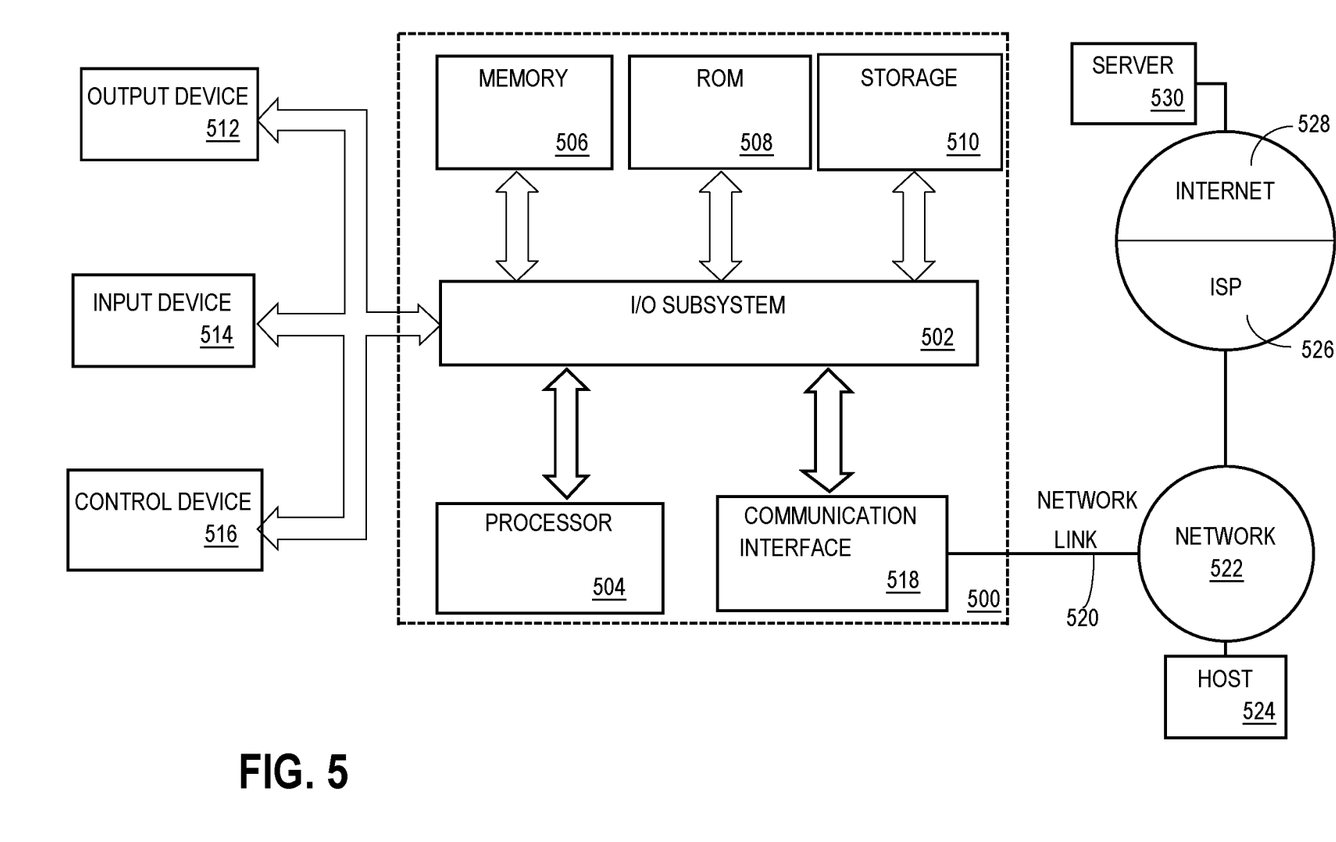
FIG. 5 is a block diagram of a computer system upon which the techniques described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for automatically enforcing by a database server a constraint to prevent overlap of ranges, comprising:
   maintaining, by the database server, a table that has an ID-Range primary key;
   wherein the ID-Range primary key has an ID part and a range part;
   wherein the table includes:
   a first set of one or more columns for storing the ID part of the ID-Range primary key, and
   a second set of two or more columns for storing the range part of the ID-Range primary key;
   wherein the constraint specifies that no row of the table may store a range that overlaps with a range specified in any other row of the table that has a same ID part of the ID-Range primary key;

maintaining, by the database server, a sorted structure sorted on the first set of one or more columns and at least one column of the second set of two or more columns;

receiving, by the database server, a request that necessitates insertion of a new row into the table, wherein the request specifies a particular ID part of the ID-Range primary key and a particular range;

wherein the particular range is associated with a particular start value and a particular end value;

finding a sorted-structure-entry-point wherein a new sorted-structure entry would be inserted, if the new row were to be inserted;

in response to the request, the database server:
searching the sorted structure from the sorted-structure-entry-point in a first direction to find a first-encountered first-direction-entry;

checking the first encountered first-direction-entry to determine whether the first encountered first-direction-entry meets certain overlap-row criteria, wherein the certain overlap-row criteria include:
the first encountered first-direction-entry specifies the particular ID part of the ID-Range primary key, and
the first encountered first-direction-entry is associated with a range that overlaps the particular range, taking into account whether each range endpoint is closed or open;

searching the sorted structure from the sorted-structure-entry-point in a second direction to find a first-encountered second-direction-entry;

wherein the second direction is opposite the first direction;

checking the first encountered second-direction-entry to determine whether the second-direction-entry meets certain overlap-row criteria, wherein the certain overlap-row criteria includes:
the first encountered second-direction-entry specifies the particular ID part of the ID-Range primary key, and
the first encountered second-direction-entry is associated with a range that overlaps the particular range, taking into account whether each range endpoint is open or closed;

responsive to finding no first encountered first-direction-entry constituting an overlap row and no first encountered second-direction-entry constituting an overlap row, allowing the new row to be inserted; and responsive to finding the first encountered first-direction-entry constituting an overlap row or the first encountered second-direction-entry constituting an overlap row, preventing insertion of the new row;

wherein the method is performed by one or more computing devices.

2. The method of claim 1 wherein the sorted structure is an index.

3. The method of claim 1 wherein the sorted structure is an index-organized table.

4. The method of claim 1 wherein the request specifies an update operation that updates an existing row in the table with one or more new values for some part of the ID-Range primary key, and the database server must ensure that the new ID-Range key does not overlap any existing row's key.

5. The method of claim 2 wherein:
the index does not store values for a particular boundary of the ranges, and
the database server uses pointers from entries of the index to retrieve from the table values for the particular boundary of the ranges.

6. A method for performing a search for a table that stores range values for entities, where each row of the table corresponds to an entity and a range, where the table is constrained to prevent any given entity from having overlapping ranges, comprising:

receiving a request for a particular row, wherein the request specifies:
a particular entity, and
a particular in-range-search value required to be in the range of the particular row;

maintaining a particular sorted structure, sorted according to one or more leading columns specifying the particular entity followed by at least one column defining at least one range end-point;

performing a first-row-halted scan to search for a particular entry that matches the particular entity;

wherein the first-row-halted scan is performed on the particular sorted structure starting from the particular entity and from the particular in-range-search value;

wherein the first-row-halted scan is first-row-descending if a first-sort-determining range column is a range start of the particular in-range-search value;

wherein the first-row-halted scan is first-row-ascending if the first-sort-determining range column is a range end of the particular in-range-search value;

responsive to not finding the particular entry, responding to the request by indicating that the table does not have the particular row;

responsive to finding the particular entry, performing:
determining whether a sole-candidate row associated with the particular entry has a range containing the particular in-range-search value;

responsive to the sole-candidate row associated with the particular entry having the range containing the particular in-range-search value, responding to the request by indicating that the sole-candidate row is the particular row; and responsive to the sole-candidate row associated with the particular entry not having the range containing the particular in-range-search value, responding to the request by indicating that the table does not have a matching row.

7. The method of claim 6 wherein the sorted structure is an index.

8. The method of claim 7 wherein:
the index does not include both range-determining values; and
determining whether a sole-candidate row associated with the particular entry has a range containing the particular in-range-search value requires reading a range-determining value, which is missing from the index, from the sole-candidate row from the table.

9. The method of claim 7 wherein:
the index includes both range-determining values; and
determining whether a sole-candidate row associated with the particular entry has a range containing the particular in-range-search value is performed by using both range-determining values of the sole-candidate row from the particular entry.

10. The method of claim 6 wherein the sorted structure is an index-organized table.

11. A method for answering queries that (a) target a table that has an ID-Range primary-key, (b) are not limited to any particular ID part value, (c) specify one or more filters on non-key columns, and (d) specify a condition on a range part of the ID-Range primary-key, comprising:

maintaining a structure mapping between values from one or more particular non-key columns to the ID part value of the ID-Range primary key values stored in the table;

maintaining a particular sorted structure, sorted according to one or more leading columns specifying the ID part value followed by at least one column defining at least one range end-point;

receiving a particular query that specifies:
   a filter condition for the particular non-key column or columns, and
   a particular in-range-search value;

responding to the particular query by:
   using the structure mapping to identify a set of ID part values that are associated with the filter condition;
   for each ID part value in the set of ID part values:
     performing a particular search technique to reach a matching row for the ID part value;
     wherein the particular search technique includes:
       performing a first-row-halted scan to search for a particular entry that matches the ID part value;
       wherein the first-row-halted scan is performed on the particular sorted structure starting from a starting point that corresponds to the ID part value and the particular in-range-search value;
       wherein the first-row-halted scan is first-row-descending if a first-sort-determining range column is a range start of the particular in-range-search value;
       wherein the first-row-halted scan is first-row-ascending if the first-sort-determining range column is a range end of the particular in-range-search value;
       responsive to not finding the particular entry, responding by indicating that the table does not have the matching row;
       responsive to finding the particular entry, performing:
          determining whether a sole-candidate row associated with the particular entry has a range containing the particular in-range-search value;
          responsive to the sole-candidate row associated with the particular entry having the range containing the particular in-range-search value, responding by indicating that the sole-candidate row is the matching row; and
          responsive to the sole-candidate row associated with the particular entry not having the range containing the particular in-range-search value, responding by indicating that the table does not have the matching row.

12. One or more non-transitory computer-readable media storing instructions which, when executed by one or more processors, cause automatic enforcement by a database server of a constraint to prevent overlap of ranges, the instructions comprising instructions for:

maintaining, by the database server, a table that has an ID-Range primary key;
wherein the ID-Range primary key has an ID part and a range part;
wherein the table includes:
   a first set of one or more columns for storing the ID part of the ID-Range primary key, and
   a second set of two or more columns for storing the range part of the ID-Range primary key;
wherein the constraint specifies that no row of the table may store a range that overlaps with a range specified in any other row of the table that has a same ID part of the ID-Range primary key;

maintaining, by the database server, a sorted structure sorted on the first set of one or more columns and at least one column of the second set of two or more columns;

receiving, by the database server, a request that necessitates insertion of a new row into the table, wherein the request specifies a particular ID part of the ID-Range primary key and a particular range;

wherein the particular range is associated with a particular start value and a particular end value;

finding a sorted-structure-entry-point wherein a new sorted-structure entry would be inserted, if the new row were to be inserted;

in response to the request, the database server:
   searching the sorted structure from the sorted-structure-entry-point in a first direction to find a first-encountered first-direction-entry;
   checking the first encountered first-direction-entry to determine whether the first encountered first-direction-entry meets certain overlap-row criteria, wherein the certain overlap-row criteria include:
   the first encountered first-direction-entry specifies the particular ID part of the ID-Range primary key, and
   the first encountered first-direction-entry is associated with a range that overlaps the particular range, taking into account whether each range endpoint is closed or open;
   searching the sorted structure from the sorted-structure-entry-point in a second direction to find a first-encountered second-direction-entry;
   wherein the second direction is opposite the first direction;
   checking the first encountered second-direction-entry to determine whether the first encountered second-direction-entry meets certain overlap-row criteria, wherein the certain overlap-row criteria includes:
   the first encountered second-direction-entry specifies the particular ID part of the ID-Range primary key, and
   the first encountered second-direction-entry is associated with a range that overlaps the particular range, taking into account whether each range endpoint is open or closed;
   responsive to finding no first encountered first-direction-entry constituting an overlap row and no first encountered second-direction-entry constituting an overlap row, allowing the new row to be inserted; and
   responsive to finding the first encountered first-direction-entry constituting an overlap row or the first encountered second-direction-entry constituting an overlap row, preventing insertion of the new row.

13. The one or more non-transitory computer-readable media of claim 12, wherein the sorted structure is an index.

14. The one or more non-transitory computer-readable media of claim 13, wherein:
the index does not store values for a particular boundary of the ranges, and
the database server uses pointers from entries of the index to retrieve from the table values for the particular boundary of the ranges.

15. The one or more non-transitory computer-readable media of claim 12, wherein the sorted structure is an index-organized table.

16. The one or more non-transitory computer-readable media of claim 12, wherein the request specifies an update operation that updates an existing row in the table with one or more new values for some part of the ID-Range primary key, and the database server must ensure that the new ID-Range key does not overlap any existing row's key.

17. One or more non-transitory computer-readable media storing instructions which, when executed by one or more processors, cause a search of a table that stores range values for entities, where each row of the table corresponds to an entity and a range, where the table is constrained to prevent any given entity from having overlapping ranges, the instructions comprising instructions for:
    receiving a request for a particular row, wherein the request specifies:
        a particular entity, and
        a particular in-range-search value required to be in the range of the particular row;
    maintaining a particular sorted structure, sorted according to one or more leading columns specifying the particular entity followed by at least one column defining at least one range end-point;
    performing a first-row-halted scan to search for a particular entry that matches the particular entity;
    wherein the first-row-halted scan is performed on the particular sorted structure starting from the particular entity and from the particular in-range-search value;
    wherein the first-row-halted scan is first-row-descending if a first-sort-determining range column is a range start of the particular in-range-search value;
    wherein the first-row-halted scan is first-row-ascending if the first-sort-determining range column is a range end of the particular in-range-search value;
    responsive to not finding the particular entry, responding to the request by indicating that the table does not have the particular row;
    responsive to finding the particular entry, performing:
        determining whether a sole-candidate row associated with the particular entry has a range containing the particular in-range-search value;
        responsive to the sole-candidate row associated with the particular entry having the range containing the particular in-range-search value, responding to the request by indicating that the sole-candidate row is the particular row; and
        responsive to the sole-candidate row associated with the particular entry not having the range containing the particular in-range-search value, responding to the request by indicating that the table does not have a matching row.

18. The one or more non-transitory computer-readable media of claim 17, wherein the sorted structure is an index.

19. The one or more non-transitory computer-readable media of claim 18, wherein:
    the index does not include both range-determining values; and
    determining whether a sole-candidate row associated with the particular entry has a range containing the particular in-range-search value requires reading a range-determining value, which is missing from the index, from the sole-candidate row from the table.

20. The one or more non-transitory computer-readable media of claim 18, wherein:
    the index includes both range-determining values, and
    determining whether a sole-candidate row associated with the particular entry has a range containing the particular in-range-search value is performed by using both range-determining values of the sole-candidate row from the particular entry.

21. The one or more non-transitory computer-readable media of claim 17, wherein the sorted structure is an index-organized table.

22. One or more non-transitory computer-readable media storing instructions which, when executed by one or more processors, cause a database server to answer queries that (a) target a table that has an ID-Range primary-key, (b) are not limited to any particular ID part value, (c) specify one or more filters on non-key columns, and (d) specify a condition on a range part of the ID-Range primary-key, the instructions comprising instructions for:
    maintaining a structure mapping between values from one or more particular non-key columns to the ID part value of the ID-Range primary key values stored in the table;
    maintaining a particular sorted structure, sorted according to one or more leading columns specifying the ID part value followed by at least one column defining at least one range end-point;
    receiving a particular query that specifies:
        a filter condition for the particular non-key column or columns, and
        a particular in-range-search value;
    responding to the particular query by:
        using the structure mapping to identify a set of ID part values that are associated with the filter condition;
        for each ID part value in the set of ID part values:
            performing a particular search technique to reach a matching row for the ID part value;
            wherein the particular search technique includes:
                performing a first-row-halted scan to search for a particular entry that matches the ID part value;
                wherein the first-row-halted scan is performed on the particular sorted structure starting from a starting point that corresponds to the ID part value and the particular in-range-search value;
                wherein the first-row-halted scan is first-row-descending if a first-sort-determining range column is a range start of the particular in-range-search value;
                wherein the first-row-halted scan is first-row-ascending if the first-sort-determining range column is a range end of the particular in-range-search value;
                responsive to not finding the particular entry, responding by indicating that the table does not have the matching row;
                responsive to finding the particular entry, performing:
                    determining whether a sole-candidate row associated with the particular entry has a range containing the particular in-range-search value;
                    responsive to the sole-candidate row associated with the particular entry having the range containing the particular in-range-search value, responding by indicating that the sole-candidate row is the matching row; and
                    responsive to the sole-candidate row associated with the particular entry not having the range containing the particular in-range-search value, responding by indicating that the table does not have the matching row.

* * * * *

UNITED STATES PATENT AND TRADEMARK OFFICE
CERTIFICATE OF CORRECTION

| | | |
|---|---|---|
| PATENT NO. | : 12,079,213 B2 | Page 1 of 1 |
| APPLICATION NO. | : 17/959551 | |
| DATED | : September 3, 2024 | |
| INVENTOR(S) | : Tow | |

It is certified that error appears in the above-identified patent and that said Letters Patent is hereby corrected as shown below:

In the Specification

In Column 6, Line 24, delete "ENo," and insert -- ENo. --, therefor.

In the Claims

In Column 16, Line 57, in Claim 9, delete "values;" and insert -- values, --, therefor.

Signed and Sealed this
Seventh Day of January, 2025

Derrick Brent
*Acting Director of the United States Patent and Trademark Office*